(12) United States Patent
Tseng

(10) Patent No.: US 9,551,399 B2
(45) Date of Patent: Jan. 24, 2017

(54) CABLE GUIDING AND PROTECTING CHAIN

(71) Applicant: Molex, LLC, Lisle, IL (US)

(72) Inventor: Ting-Chang Tseng, Taipei (TW)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/016,471

(22) Filed: Feb. 5, 2016

(65) Prior Publication Data

US 2016/0258509 A1 Sep. 8, 2016

(30) Foreign Application Priority Data

Feb. 6, 2015 (TW) .............................. 104202003 U

(51) Int. Cl.
 *F16G 13/16* (2006.01)
 *H02G 3/04* (2006.01)

(52) U.S. Cl.
 CPC ................ *F16G 13/16* (2013.01); *H02G 3/04* (2013.01)

(58) Field of Classification Search
 CPC ............. F16G 13/16; F16G 3/015; H02G 3/04
 USPC ......................................................... 59/78.1
 See application file for complete search history.

(56) References Cited

U.S. PATENT DOCUMENTS

| 3,664,619 | A | * | 5/1972 | Heidrich | ................. | F16G 13/16 |
| | | | | | | 248/51 |
| 5,638,672 | A | * | 6/1997 | Furukawa | ............... | F16G 13/16 |
| | | | | | | 248/49 |
| 6,029,437 | A | | 2/2000 | Hart | | |
| 6,065,278 | A | | 5/2000 | Weber et al. | | |
| 6,094,902 | A | * | 8/2000 | Drews | ..................... | F16G 13/16 |
| | | | | | | 248/49 |
| 6,550,232 | B1 | * | 4/2003 | Achs | .................... | H02G 11/006 |
| | | | | | | 248/49 |
| 7,017,328 | B2 | * | 3/2006 | Komiya | .................. | F16G 13/16 |
| | | | | | | 248/49 |
| 7,387,046 | B2 | | 6/2008 | Ikeda et al. | | |

FOREIGN PATENT DOCUMENTS

CN 101677180 A 3/2010

* cited by examiner

*Primary Examiner* — David B Jones
(74) *Attorney, Agent, or Firm* — Stephen L. Sheldon

(57) ABSTRACT

A cable guiding-protecting chain comprises a plurality of chain members connected in series. Each chain member comprises two connection plates which face each other and are spaced apart from each other and a first link plate and a second link plate which each connect the two connection plates. The two connection plates, the first link plate and the second link plate cooperate to define a passing space penetrating from the front to the rear. Each connection plate has an inner link portion at a front segment thereof, an outer link portion at a rear segment thereof and an outer step portion. The outer link portion has a rear end edge which is arcuate in shape and a thinned portion which is close to the rear end edge and is thinned in thickness at a side adjacent to the passing space.

12 Claims, 8 Drawing Sheets

CABLE GUIDING AND PROTECTING CHAIN

RELATED APPLICATIONS

This application claims priority to Taiwanese Application No. 104202003, filed Feb. 6, 2015, which is incorporated herein by reference in its entirety.

TECHNICAL FIELD

The present disclosure relates to a protecting chain, and more specifically to a cable guiding-protecting chain.

BACKGROUND ART

An existing cable guiding chain comprises a plurality of chain members, each chain member comprises a pair of inner connection plates and a pair of outer connection plates, a width between the two outer connection plates is more than a width between the two inner connection plates, the plurality of chain members are connected to each other in a manner that the two outer connection plates of the chain member at the front are respectively pivot to the two inner connection plates of the chain member at the rear so as to allow the plurality of chain members are connected in series, thereby defining an interior passing space through which a cable may pass and attaining the function of protecting the cable. Such a cable guiding chain is disclosed in Chinese patent application No. CN200810211522.0 (corresponding to Taiwanese patent application No. TW97134895), U.S. Pat. No. 7,387,046 (corresponding to Chinese patent application No. CN200410088034.7), and U.S. Pat. No. 6,029,437.

However, such a cable guiding chain has a problem in that, when every two chain members are pivot to each other, the two outer connection plates of the chain member at the front are respectively attached onto two outer sides of the two inner connection plates of the chain member at the rear, and the two outer connection plates of the chain member at the front are generally aligned with the two outer connection plates of the chain member at the rear respectively, if it is desired to disassemble the two chain members pivot to each other, a force is not easily applied to allow the outer connection plate of the chain member at the front to be disengaged from the inner connection plate of the chain member at the rear, and in turn the pivot relationship between the two chain members is not easily released, and during disassembling, the two chain members may also be easily damaged.

SUMMARY OF THE INVENTION

In an embodiment, a cable guiding-protecting chain comprises a plurality of chain members connected in series. Each chain member comprises two connection plates which face each other and are spaced apart from each other and a first link plate and a second link plate which each connect the two connection plates, face each other and are spaced apart from each other. The two connection plates, the first link plate and the second link plate cooperate to define a passing space penetrating from the front to the rear. Each connection plate has an inner link portion at a front segment thereof, an outer link portion at a rear segment thereof and an outer step portion, a width between two opposite outside surfaces of the two inner link portions is less than a width between two facing inside surfaces of the two outer link portions. The outer link portion has a rear end edge which is arcuate in shape and a thinned portion which is close to the rear end edge and is thinned in thickness at a side adjacent to the passing space, the outer step portion is positioned between an outside surface of the connection plate and an outside surface of the inner link portion and has a recessed portion rearwardly recessed. In every two chain members pivot to each other in series, the two outer link portions of the two connection plates of the chain member at the front are respectively rotatably connected to the two inner link portions of the two connection plates of the chain member at the rear and are respectively positioned outside of the two inner link portions, and each thinned portion of the chain member at the front cooperates with the corresponding outside surface of the inner link portion of the chain member at the rear to define a first insertion space, and each rear end edge of the outer link portion of the chain member at the front is spaced apart from the corresponding recessed portion of the chain member at the rear and cooperates with the corresponding recessed portion of the chain member at the rear to define a second insertion space, the first insertion space and the second insertion space at the same side are communicated.

BRIEF DESCRIPTION OF THE DRAWINGS

The other features and effects of the present disclosure will be apparent through the embodiments in combination with the Figures, and.

DETAILED DESCRIPTION OF THE PREFERRED EMBODIMENTS

The following description relates to specific embodiments in combination with FIGURES which may implement the present disclosure. Representations of directions, such as up, down, front rear, left and right, in the present disclosure are only the directions shown in the Figures. Therefore representations of directions are only used for explanation, but are not used to limit the present disclosure. Therefore, an object of the present disclosure is to provide a cable guiding-protecting chain which is easily disassembled.

The effect of the present disclosure lies in that: in every two chain members connected in series, each thinned portion of the outer link portion of the chain member at the front cooperates with the corresponding outside surface of the inner link portion of the chain member at the rear so as to define the first insertion space, and each rear end edge of the two outer link portions of the chain member at the front is spaced apart from the corresponding recessed portion of the outer step portion of the chain member at the rear and cooperates with the corresponding recessed portion of the outer step portion of each chain member at the rear so as to define the second insertion space, the first insertion space and the second insertion space at the same side are communicated so as to allow a tool to be inserted, and allow the outer link portion of the chain member at the front to be disengaged from the inner link portion of the chain member at the rear, and in turn easily disassemble every two chain members connected in series.

Figure 1:
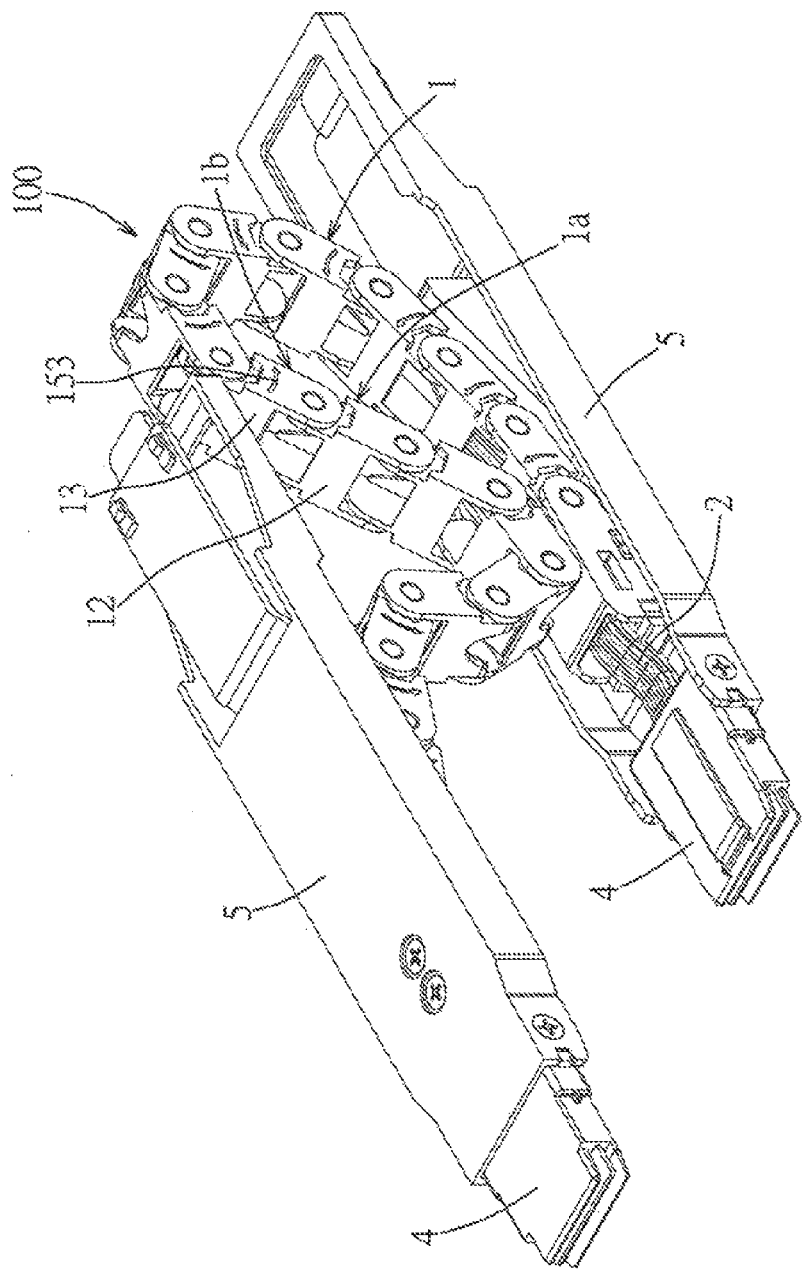
FIG. 1 is a perspective view illustrating an embodiment of a cable guiding-protecting chain of the present disclosure is suitable for protecting a cable.
Figure 2:
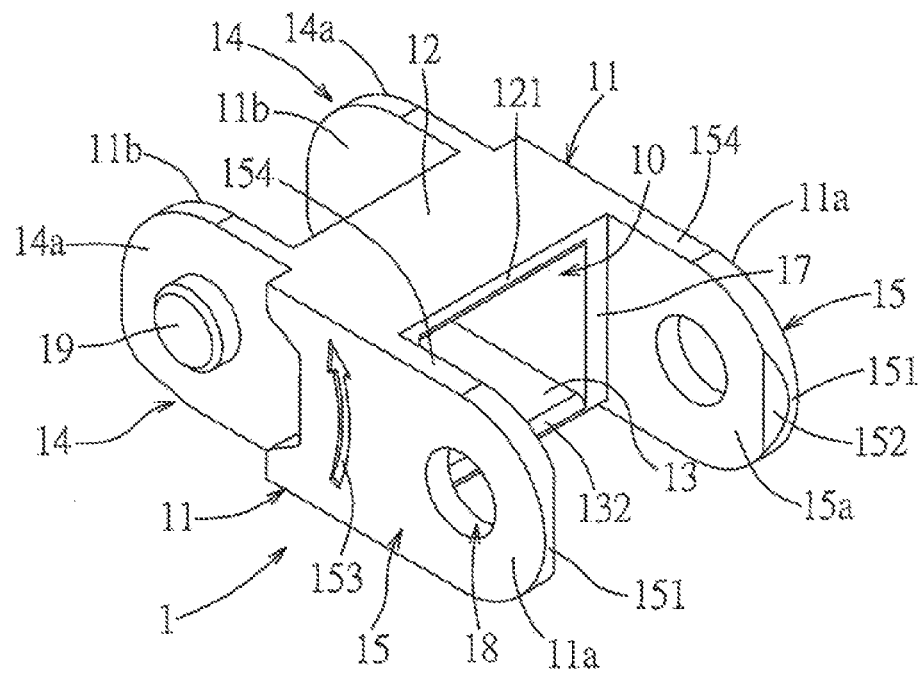
FIG. 2 is a perspective view illustrating a chain member viewed from an angle.
Figure 3:
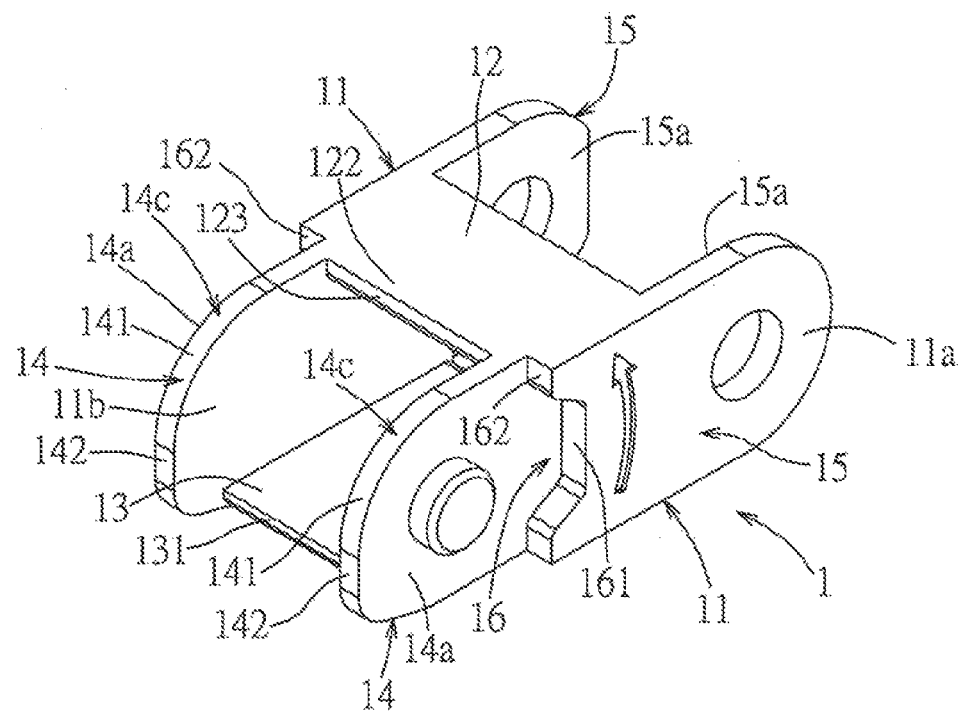
FIG. 3 is a perspective view illustrating the chain member viewed from another angle.

Referring to FIG. 1, FIG. 2 and FIG. 3, an embodiment of a cable guiding-protecting chain of the present disclosure is suitable for protecting a cable 2, the cable 2 may be used in, for example, a server (not shown). Specifically, the cable 2 passes through the cable guiding-protecting chain 100, two ends of the cable 2 are respectively connected to two connectors 4, the two connectors 4 are respectively provided to two frames 5, herein one frame 5 may move relative to the other frame 5.

The cable guiding-protecting chain 100 of the embodiment comprises a plurality of chain members 1. The plurality of chain members 1 are connected to each other in series and every two chain members 1 are pivotally connected to each other. Each chain member 1 comprises two connection plates 11, a first link plate 12 and a second link plate 13. The two connection plates 11 face each other and are spaced apart from each other, the first link plate 12 and the second link plate 13 respectively each connect the two connection plates 11, and the first link plate 12 and the second link plate 13 face each other and are spaced apart from each other. The two connection plates 11, the first link plate 12 and the second link plate 13 are integrally formed and cooperate to define a passing space 10 penetrating from the front to the rear, the passing space 10 allows the cable 2 to pass through and allow the cable 2 to be protected by the two connection plates 11, the first link plate 12 and the second link plate 13.

Specifically, each connection plate 11 has an inner link portion 14, an outer link portion 15, an outer step portion 16, an inner step portion 17, a first pivot unit 18 and a second pivot unit 19. Each connection plate 11 has an outside surface 11a and an inside surface 11b, the inner link portion 14 is formed by that a front segment of the outside surface 11a of the connection plate 11 is recessed inwardly, the outer link portion 15 is formed by that a rear segment of the inside surface 11b of the connection plate 11 is recessed outwardly. A width between two opposite outside surfaces 14a of the two inner link portions 14 is less than a width between two facing inside surfaces 15a of the two outer link portions 15. The first pivot unit 18 is provided to the outer link portion 15, and the second pivot unit 19 is provided to the inner link portion 14. In the embodiment, the first pivot unit 18 is a pivot hole penetrating the outer link portion 15, and the second pivot unit 19 is a pivoting shaft protruding from the outside surface 14a of the inner link portion 14.

The inner link portion 14 of each connection plate 11 has a front end edge 14c extending from the first link plate 12 to the second link plate 13, the front end edge 14c forms an arcuate chamfer 141 and a first stopping portion 142, with respect to the position where the first link plate 12 and the second link plate 13 are present, the arcuate chamfer 141 is close to the first link plate 12 relative to the first stopping portion 142, the first stopping portion 142 is close to the second link plate 13 relative to the arcuate chamfer 141, and a distance from the second pivot unit 19 to the first stopping portion 142 is more than a distance from the second pivot unit 19 to the arcuate chamfer 141, the function of which will be described later.

The outer step portion 16 is positioned between the outside surface 11a of the connection plate 11 and the outside surface 14a of the inner link portion 14 and faces forwardly, and the outer step portion 16 has a recessed portion 161 recessed rearwardly and a second stopping portion 162 close to the first link plate 12. The inner step portion 17 is positioned between the inside surface 11b of the connection plate 11 and the inside surface 15a of the outer link portion 15 and faces rearwardly. The outer link portion 15 has a rear end edge 151 which is arcuate in shape and a thinned portion 152 which is close to the rear end edge 151 and is thinned in thickness at a side adjacent to the passing space 10, it should be noted that, the thinned portion 152 may be an oblique surface or an equivalent thinned structure. Moreover, a rear edge 121 of the first link plate 12 forms a stopping edge and an outside surface of the first link plate 12 close to a front edge 123 forms a third stopping portion 122.

Figure 4:
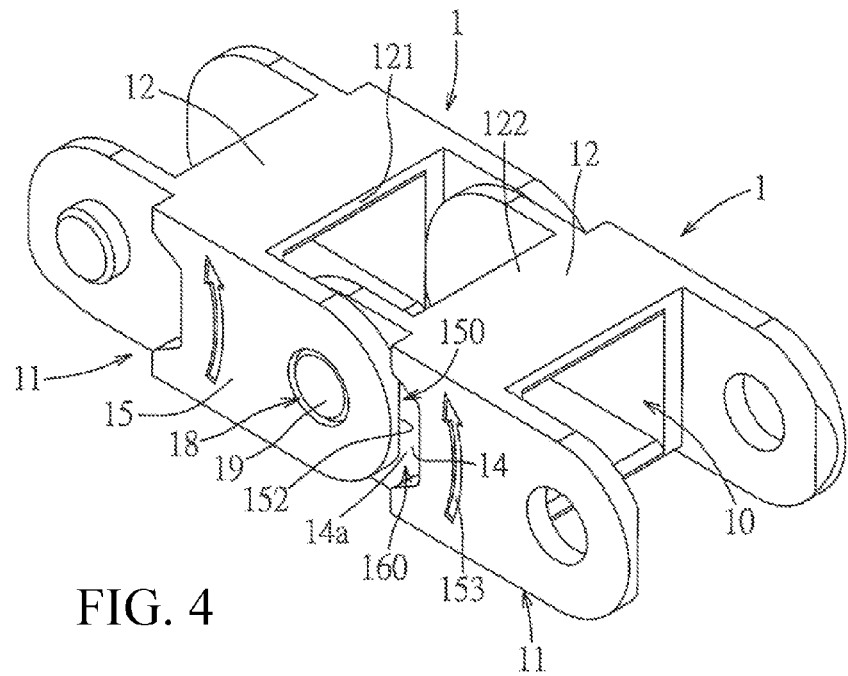
FIG. 4 is a perspective view illustrating the two chain members connected in series viewed from an angle.
Figure 5:
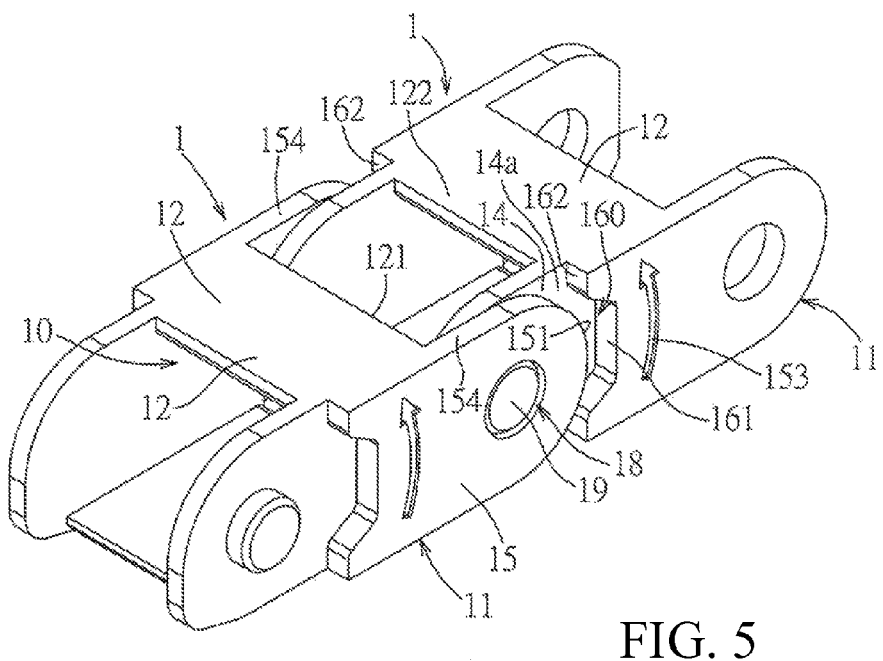
FIG. 5 is a perspective view illustrating the two chain members connected in series viewed from another angle.
Figure 6:
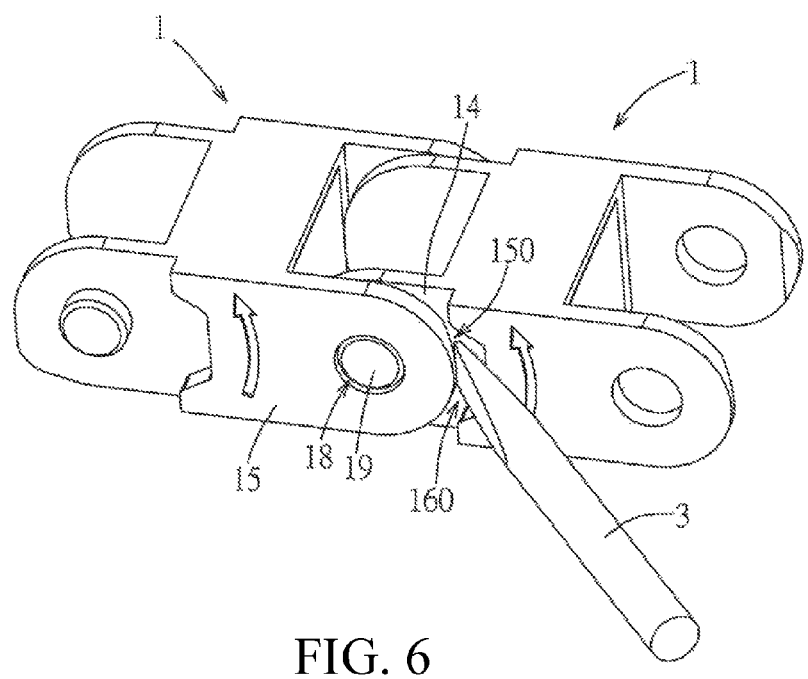
FIG. 6 is a perspective view illustrating a first insertion space and a second insertion space, which are positioned at the same side, of the two chain members connected in series are communicated for insertion of a tool.

Referring to FIG. 4, FIG. 5 and FIG. 6, every two chain members 1 connected in series are illustrated. The two outer link portions 15 of the two connection plates 11 of the chain member 1 at the front are respectively pivotally connected to the two inner link portions 14 of the two connection plates 11 of the chain member 1 at the rear and are respectively positioned outside of the two inner link portions 14. Specifically, every two chain members 1 connected in series are engaged with and pivotally connected to each other by means of the two pivoting shafts and the two pivot holes. In other words, every two chain members 1 connected in series can be pivotally connected to each other by the two second pivot units 19 being respectively inserted into the two first pivot units 18. As can be appreciated, the first pivot unit 18 may also be a pivoting shaft and the second pivot unit 19 may be a pivot hole, so as to similarly attain a purpose that two chain members 1 connected in series are pivot to each other, and the pivoting mechanism is not limited to one disclosed in the embodiment.

Moreover, each thinned portion 152 of the outer link portion 15 of the chain member 1 at the front cooperates with the corresponding outside surface 14a of the inner link portion 14 of the chain member 1 at the rear so as to define a first insertion space 150, and each rear end edge 151 of the outer link portion 15 of the chain member 1 at the front is spaced apart from the corresponding recessed portion 161 of the outer step portion 16 of the chain member 1 at the rear and cooperates with the corresponding recessed portion 161 of the outer step portion 16 of each chain member 1 at the rear so as to define a second insertion space 160, the first insertion space 150 and the second insertion space 160 at the same side are communicated so as to allow a tool 3 to be inserted, the tool 3 may a flat head screw driver, as shown in FIG. 6, however the tool 3 may also be other types of insertion tools, and the tool 3 is not limited to the configuration as disclosed in the embodiment. Therefore, a user may insert the tool 3 into the first insertion space 150 and the second insertion space 160 and easily disassemble every two chain members 1 connected in series, so as to help replace or repair the cable 2 (see FIG. 1), or replace the chain member 1, and prevent the chain member 1 from being damaged during disassembling.

Figure 7:
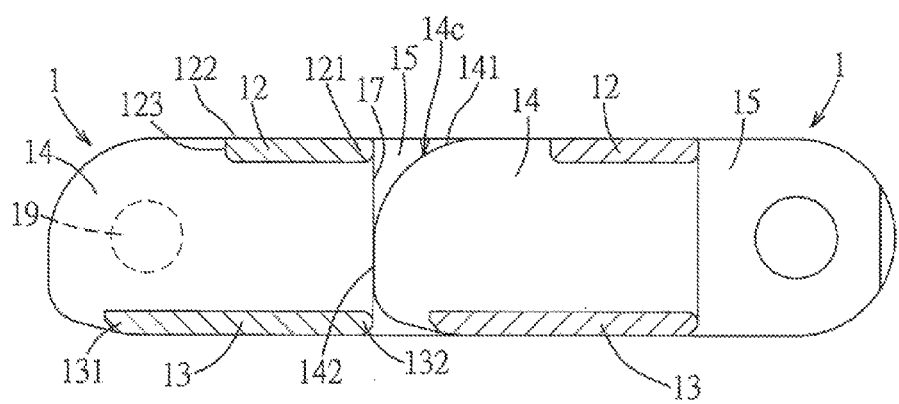
FIG. 7 is a cross sectional view illustrating that when the two chain members connected in series are arranged in a straight line, two first stopping portions of two connection plates of the chain member at the rear respectively abut against two inner step portions of two connection plates of the chain member at the front, therefore the chain member at the rear is restricted so that the chain member at the rear cannot rotate toward a position where the second link plate of the chain member at the front is present.

Referring to FIG. 7, it should be specially noted that, a front edge 131 of the second link plate 13 of each chain member 1 extends forwardly beyond the front edge 123 of the first link plate 12, and a rear edge 132 of the second link plate 13 and the rear edge 121 of the first link plate 12 are flushed with each other. In addition, the front edge 131 of the second link plate 13 of each chain member 1 is positioned close to the front relative to an axial center of the second pivot unit 19. In combination with referring to FIG. 2 and FIG. 3, the function of the arcuate chamfer 141 and the first stopping portion 142 of the inner link portion 14 of each connection plate 11 of the chain member 1 lies in that, for example, when every two chain members 1 connected in series are arranged in a straight line as shown in FIG. 7, the two first stopping portions 142 of the two connection plates 11 of the chain member 1 at the rear will respectively abut against the two inner step portions 17 of the two connection plates 11 of the chain member 1 at the front, so that the chain member 1 at the rear cannot further rotate toward a direction close to the second link plate 13 of the chain member 1 at the front (that is, in FIG. 7, the chain member 1 at the rear clockwisely rotates relative to the chain member 1 at the front); but when the chain member 1 at the rear will rotate in a direction close to the first link plate 12 of the chain member 1 at the front (that is, in FIG. 7, the chain member 1 at the rear will rotate anticlockwisely relative to the chain member 1 at the front), the arcuate chamfers 141 of the two connection plates 11 will not contact the two inner step portions 17 of the two connection plates 11 of the chain member 1 at the front, so that the chain member 1 at the rear can smoothly rotate toward a position where the first link plate 12 of the chain member 1 at the front is present. In addition, one of the two connection plates 11 of each chain member 1 further has an arrow mark 153 formed on the outside surface 11a of the outer link portion 15, a pointing direction of the arrow mark 153 is a direction that the chain member 1 at the rear can rotate so as to be close to the first link plate 12 of the chain member 1 at the front.

Figure 8:
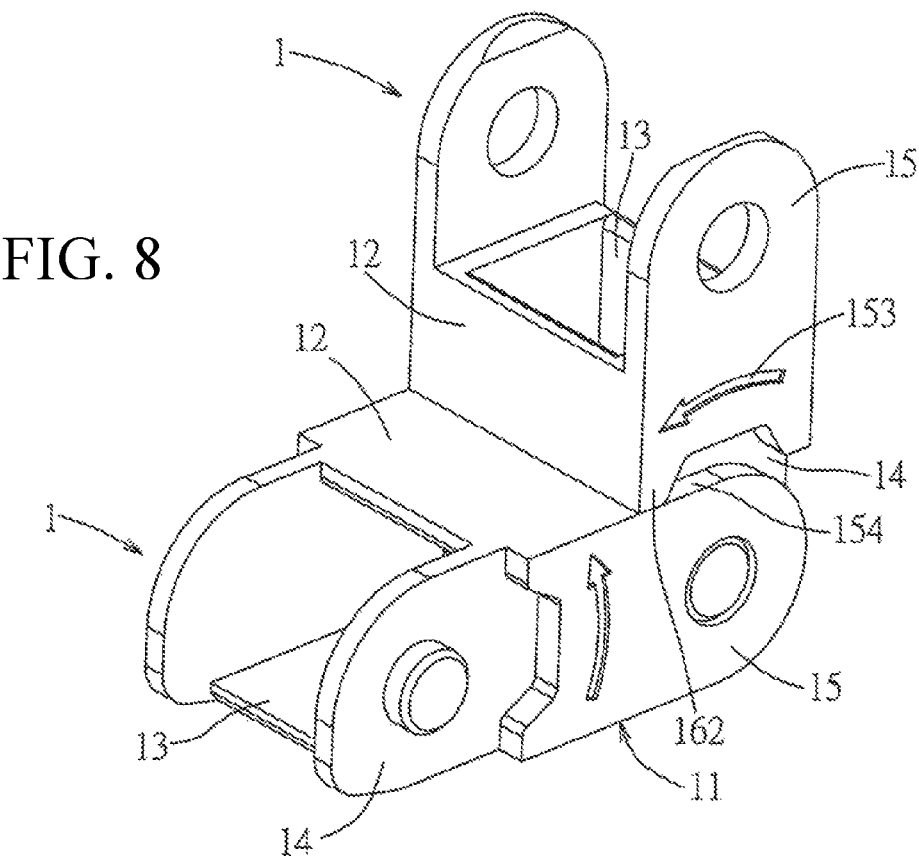
FIG. 8 is a perspective view illustrating a status of two chain members connected in series, when the chain member at the rear rotates to a maximum rotation angle toward a position where the first link plate of the chain member at the front is present, two second stopping portions of the two connection plates of the chain member at the rear respectively abut against two side edges of two outer link portions of the two connection plates of the chain member at the front.
Figure 9:
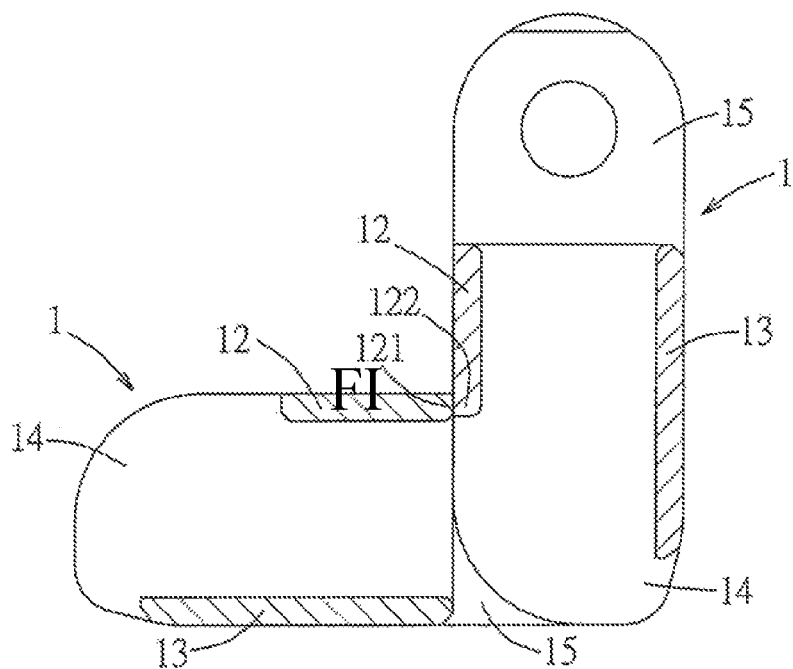
FIG. 9 is a cross sectional view illustrating the status of two chain members connected in series, when the chain member at the rear rotates to the maximum rotation angle toward a position where the first link plate of the chain member at the front is present, a third stopping portion of the first link plate of the chain member at the rear abuts against a rear edge of the first link plate of the chain member at the front.

Referring to FIG. 8 and FIG. 9, in every two chain members 1 connected in series, when the chain member 1 at the rear rotates to a maximum rotation angle in the direction close to the first link plate 12 of the chain member 1 at the front, the two second stopping portions 162 of the two connection plates 11 of the chain member 1 at the rear respectively abut against two side edges 154 of the two outer link portions 15 of the two connection plates 11 of the chain member 1 at the front, at the same time, the third stopping portion 122 of the first link plate 12 of the chain member 1 at the rear abuts against the rear edge 121 of the first link plate 12 of the chain member 1 at the front. It should be especially noted that, when the chain member 1 at the rear rotates to the maximum rotation angle relative to the chain member 1 at the front, the first link plate 12 and the second link plate 13 of one of the two chain members 1 do not enter into the passing space 10 of the other of the two chain members 1, therefore it may assure that, when the two chain members 1 rotate relative to each other, the two first link plates 12 and the two second link plates 13 of the two chain members 1 do not excessively squeeze the cable 2 (see FIG. 1) so as to prevent the cable 2 from being damaged.

Figure 10:
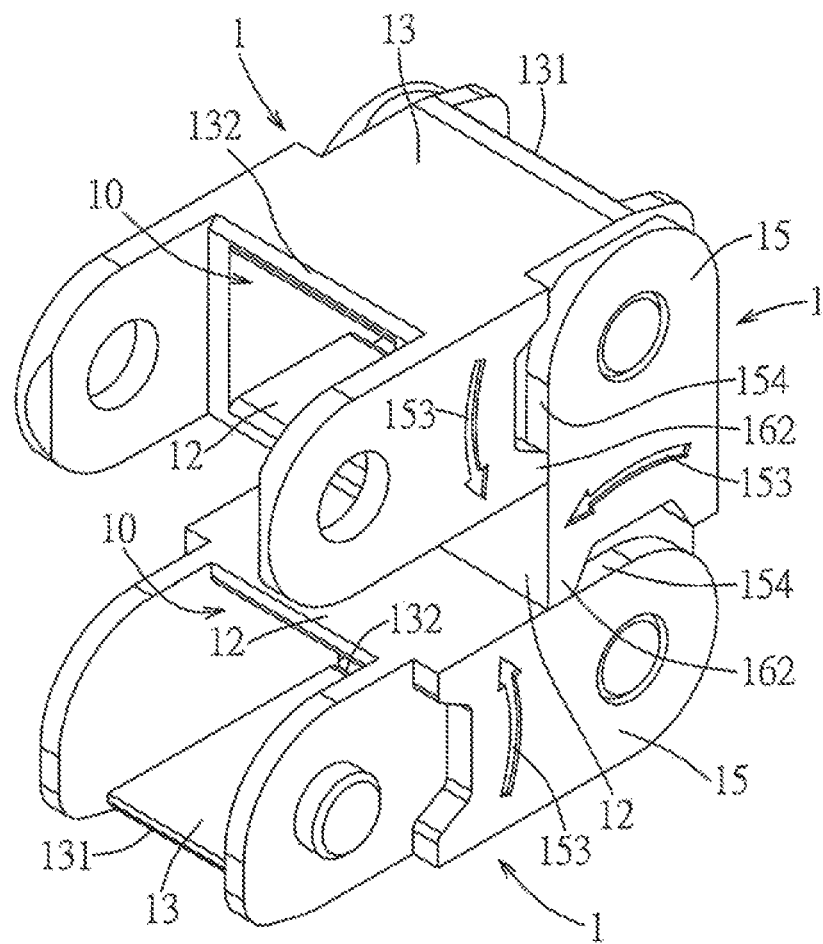
FIG. 10 is a perspective view illustrating three chain members are connected to each other in a manner that all three first link plates are positioned at the same side.

Referring to FIG. 1 and FIG. 10, when the plurality of chain members 1 are connected in a manner that the first link plates 12 of the plurality of chain members 1 are positioned at the same side, a rotation direction of the chain member 1 at the rear relative to the chain member 1 at the front is the same for the plurality of chain members 1 (as shown by the arrow marks 153 in FIG. 10, the chain member 1 at the rear can rotate anticlockwisely relative to the chain member 1 at the front), so that the cable 2 may be bent and changed in direction along the plurality of chain members 1.

Figure 11:
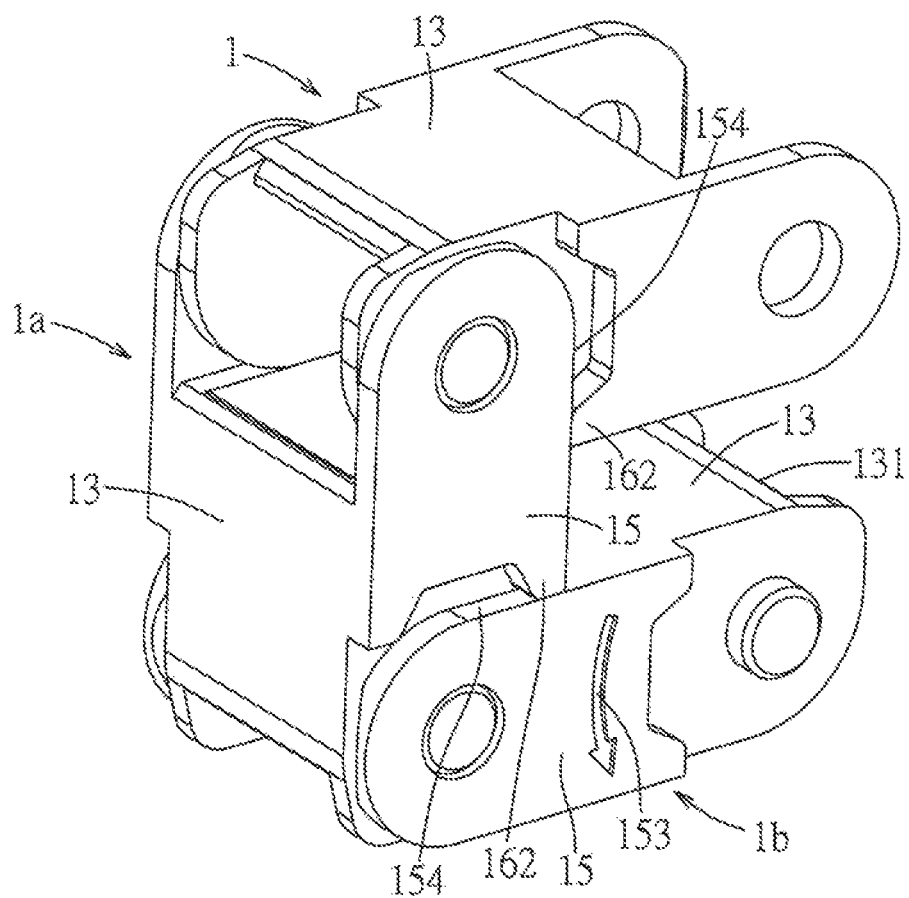
FIG. 11 is a perspective view illustrating three chain members, in which two chain members are connected in series in a manner that one of the two chain members to be reversed and in turn allow the first link plate of the chain member at the front of the two chain members and the second link plate of the chain member at the rear of the two chain members to be positioned at the same side, so that a part of the three chain members forms a different rotation direction.
Figure 12:
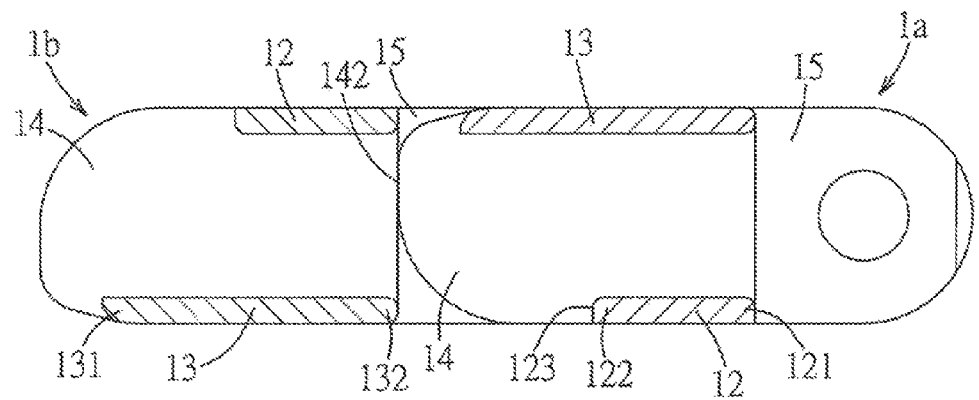
FIG. 12 is a cross sectional view illustrating that when two chain members connected in series are arranged in a straight line, two first stopping portions of the two connection plates of the chain member at the rear respectively abut against the two inner step portions of the two connection plates of the chain member at the front, the chain member at the rear is restricted so that the chain member at the rear cannot rotate toward a position where the second link plate of the chain member at the front is present.

Referring to FIG. 1, FIG. 11 and FIG. 12, in the embodiment, in order to allow that each chain member 1 of the cable guiding-protecting chain 100 can rotate toward a predetermined direction, taking the chain member 1 indicated by reference numeral 1a and the chain member 1 indicated by reference numeral 1b in FIG. 1 as example, the chain member 1a at the rear is reversely rotated (i.e. is rotated by 180 degrees) and then is pivot to the chain member 1b at the front, so that a relative position relationship between the first link plate 12 and the second link plate 13 of the chain member 1a at the rear is reversed with a relative position relationship between the first link plate 12 and the second link plate 13 of the chain member 1b at the front. Because the two first stopping portions 142 of the chain member 1a at the rear respectively abut against the two inner step portions 17 of the chain member 1b at the front, the chain member 1a at the rear is restricted so that the chain member 1a at the rear only can rotate toward a direction close to the second link plate 13 of the chain member 1b at the front, therefore a part of the plurality of chain members 1 form a different rotation direction, and in turn change a bent direction of the cable 2, so as to benefit for the cable 2 to be expanded or collapsed according to a user's desire. Moreover, when the chain member 1a at the rear rotates to the maximum rotation angle, the rear edge 132 of the second link plate 13 of the chain member 1b at the front forms a stopping edge, and the third stopping portion 122 of the chain member 1a at the rear abuts against the rear edge 132 of the second link plate 13 of the chain member 1b at the front.

It should be noted that, the front edge 131 and the rear edge 132 of the second link plate 13 of each chain member 1 each are a chamfer or a circle corner in the outer side edge, so that during the collapsing process or the expanding process of the plurality of chain members 1, the plurality of chain members 1 smoothly move relative to each other, and friction among the plurality of chain members 1 is reduced.

Figure 13:
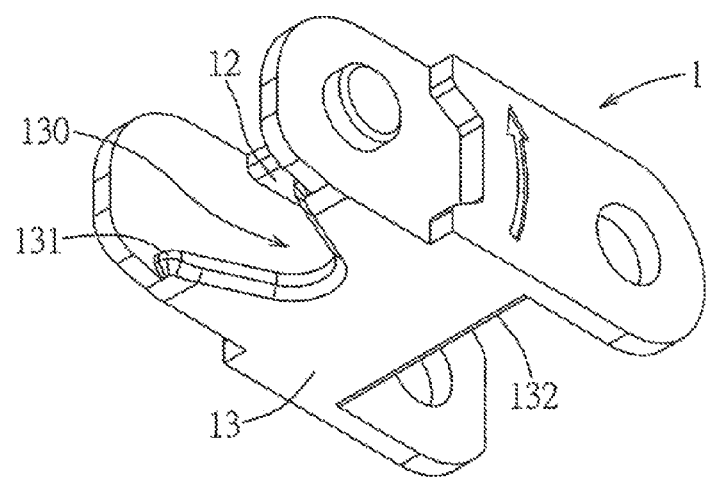
FIG. 13 is a perspective view illustrating a front edge of the second link plate of the chain member is formed with a notch.

Finally, referring to FIG. 13, the front edge 131 of the second link plate 13 of each chain member 1 may be also formed with a notch 130, such a configuration may save material and reduce manufacturing cost of each chain member 1.

In conclusion, in every two chain members 1 connected in series, each thinned portion 152 of the outer link portion 15 of the chain member 1 at the front cooperates with the corresponding outside surface 14a of the inner link portion 14 of the chain member 1 at the rear so as to define the first insertion space 150, and each rear end edge 151 of the two outer link portions 15 of the chain member 1 at the front is spaced apart from the corresponding recessed portion 161 of the outer step portion 16 of the chain member 1 at the rear and cooperates with the corresponding recessed portion 161 of the outer step portion 16 of each chain member 1 at the rear so as to define the second insertion space 160, wherein the first insertion space 150 and the second insertion space 160 at the same side are communicated so as to allow the tool 3 to be inserted, and allow the outer link portion 15 of the chain member 1 at the front to be disengaged from the inner link portion 14 of the chain member 1 at the rear. In this way it is easy to disassemble every two chain members 1 connected in series, therefore the object of the present disclosure is definitely attained.

The above described are only the embodiments, which cannot limit the scope of the implementation of the present disclosure, namely simple equivalent variations and modifications made according to the scope of the claims and content of the present disclosure are still fallen within the scope of the present disclosure.

What is claimed is:

1. A cable guiding-protecting chain, comprising:
a plurality of chain members connected in series, each chain member comprising two connection plates which face each other and are spaced apart from each other and a first link plate and a second link plate which each connect the two connection plates, face each other and are spaced apart from each other, the two connection plates, the first link plate and the second link plate cooperating to define a passing space penetrating from the front to the rear, each connection plate having an inner link portion at a front segment thereof, an outer link portion at a rear segment thereof and an outer step portion, a width between two opposite outside surfaces of the two inner link portions being less than a width between two facing inside surfaces of the two outer link portions, the outer link portion having a rear end edge which is arcuate in shape and a thinned portion which is close to the rear end edge and is thinned in thickness at a side adjacent to the passing space, the outer step portion being positioned between an outside surface of the connection plate and an outside surface of the inner link portion and having a recessed portion rearwardly recessed;

in every two chain members pivot to each other in series, the two outer link portions of the two connection plates of the chain member at the front being respectively rotatably pivot to the two inner link portions of the two connection plates of the chain member at the rear and being respectively positioned outside of the two inner link portions, and each thinned portion of the chain member at the front cooperating with the corresponding outside surface of the inner link portion of the chain member at the rear to define a first insertion space, and each rear end edge of the outer link portion of the chain member at the front being spaced apart from the corresponding recessed portion of the chain member at the rear and cooperating with the corresponding recessed portion of the chain member at the rear to define a second insertion space, the first insertion space and the second insertion space at the same side being communicated, wherein each connection plate of the plurality of chain members further has a first pivot unit provided to the outer link portion and a second pivot unit provided to the inner link portion, and one of the first pivot unit and the second pivot unit is a pivot hole, and the other of the first pivot unit and the second pivot unit is a pivoting shaft, every two chain members connected in series are pivotally connected to each other by the two pivoting shafts being respectively engaged with the two pivot holes and wherein a front edge of the second link plate of each chain member extends forwardly beyond a front edge of the first link plate, and a rear edge of the second link plate and a rear edge of the first link plate are flush with each other.

2. The cable guiding-protecting chain according to claim 1, wherein the first pivot unit is a pivot hole and the second pivot unit is a pivoting shaft.

3. The cable guiding-protecting chain according to claim 1, wherein the front edge of the second link plate of each chain member is positioned close to the front relative to an axial center of the second pivot unit.

4. The cable guiding-protecting chain according to claim 1, wherein the front edge of the second link plate of each chain member is formed with a notch.

5. The cable guiding-protecting chain according to claim 1, wherein the thinned portion of the outer link portion of each connection plate is an oblique surface.

6. The cable guiding-protecting chain according to claim 1, wherein in every two chain members connected in series, when the chain member at the rear rotates to a maximum rotation angle relative to the chain member at the front, the first link plate and the second link plate of one chain member do not enter into the passing space of the other chain member.

7. A cable guiding-protecting chain, comprising:
a plurality of chain members connected in series, each chain member comprising two connection plates which face each other and are spaced apart from each other and a first link plate and a second link plate which each connect the two connection plates, face each other and are spaced apart from each other, the two connection plates, the first link plate and the second link plate cooperating to define a passing space penetrating from the front to the rear, each connection plate having an inner link portion at a front segment thereof, an outer link portion at a rear segment thereof and an outer step portion, a width between two opposite outside surfaces of the two inner link portions being less than a width between two facing inside surfaces of the two outer link portions, the outer link portion having a rear end edge which is arcuate in shape and a thinned portion which is close to the rear end edge and is thinned in thickness at a side adjacent to the passing space, the outer step portion being positioned between an outside surface of the connection plate and an outside surface of the inner link portion and having a recessed portion rearwardly recessed;

in every two chain members pivot to each other in series, the two outer link portions of the two connection plates of the chain member at the front being respectively rotatably pivot to the two inner link portions of the two connection plates of the chain member at the rear and being respectively positioned outside of the two inner link portions, and each thinned portion of the chain member at the front cooperating with the corresponding outside surface of the inner link portion of the chain member at the rear to define a first insertion space, and each rear end edge of the outer link portion of the chain member at the front being spaced apart from the corresponding recessed portion of the chain member at the rear and cooperating with the corresponding recessed portion of the chain member at the rear to define a second insertion space, the first insertion space and the second insertion space at the same side being communicated, wherein each connection plate of each chain member further has an inner step portion formed between an inside surface of the connection plate and the inside surface of the outer link portion, and a front end edge of the inner link portion is formed with an arcuate chamfer and a first stopping portion, the arcuate chamfer is close to the first link plate relative to the first stopping portion, the first stopping portion is close to the second link plate relative to the arcuate chamfer, wherein, when every two chain members connected in series are arranged in a straight line, the two first stopping portions of the two connection plates of the chain member at the rear respectively abut against the two inner step portions of the two connection plates of the chain member at the front, wherein in operation the chain member at the rear is restricted so that the chain member at the rear cannot rotate toward a position where the second link plate of the chain member at the front is present, but the two arcuate chamfers of the two connection plates of the chain member at the rear can respectively pass through the two inner step portions of the two connection plates of the chain member at the front, so that the chain member at the rear can rotate toward a position where the first link plate of the chain member at the front is present.

8. The cable guiding-protecting chain according to claim 7, wherein the outer step portion of each connection plate further has a second stopping portion close to the first link plate, in every two chain members connected in series, wherein, when the chain member at the rear rotates to a maximum rotation angle toward a position where the first link plate of the chain member at the front is present, the two second stopping portions of the two connection plates of the chain member at the rear respectively abut against two side edges of the two outer link portions of the two connection plates of the chain member at the front.

9. The cable guiding-protecting chain according to claim 8, wherein a rear edge of the first link plate of each chain member forms a stopping edge, and an outside surface of the front edge of the first link plate forms a third stopping portion, in every two chain members connected in series, wherein, when the chain member at the rear rotates to the maximum rotation angle toward the position where the first link plate of the chain member at the front is present, the third stopping portion of the first link plate of the chain member at the rear abuts against the rear edge of the first link plate of the chain member at the front.

10. The cable guiding-protecting chain according to claim 7, wherein a first portion of the plurality of chain members connected in series are connected so that all the first link plates of the some chain members are positioned at the same side, and a second portion of the plurality of chain members connected in series are connected in a manner that one chain member of the some other chain members is reversed and the first link plate of the one chain member and the second link plates of the remaining chain members of the some other chain members are positioned at the same side, wherein the first portion and second portions have different rotation directions.

11. The cable guiding-protecting chain according to claim 10, wherein when the two chain members connected in series are connected in a manner that one of the two chain members is reversed so as to allow that the first link plate of the chain member at the front and the second link plate of the chain member at the rear are positioned at the same side, a rear edge of the second link plate of the chain member at the front forms a stopping edge, and wherein, when the chain member at the rear rotates to a maximum rotation angle toward a position where the first link plate of the chain member at the front is present, the third stopping portion of the first link plate of the chain member at the rear abuts against the rear edge of the second link plate of the chain member at the front.

12. A cable guiding-protecting chain, comprising:

a plurality of chain members connected in series, each chain member comprising two connection plates which face each other and are spaced apart from each other and a first link plate and a second link plate which each connect the two connection plates, face each other and are spaced apart from each other, the two connection plates, the first link plate and the second link plate cooperating to define a passing space penetrating from the front to the rear, each connection plate having an inner link portion at a front segment thereof, an outer link portion at a rear segment thereof and an outer step portion, a width between two opposite outside surfaces of the two inner link portions being less than a width between two facing inside surfaces of the two outer link portions, the outer link portion having a rear end edge which is arcuate in shape and a thinned portion which is close to the rear end edge and is thinned in thickness at a side adjacent to the passing space, the outer step portion being positioned between an outside surface of the connection plate and an outside surface of the inner link portion and having a recessed portion rearwardly recessed;

in every two chain members pivot to each other in series, the two outer link portions of the two connection plates of the chain member at the front being respectively rotatably pivot to the two inner link portions of the two connection plates of the chain member at the rear and being respectively positioned outside of the two inner link portions, and each thinned portion of the chain member at the front cooperating with the corresponding outside surface of the inner link portion of the chain member at the rear to define a first insertion space, and each rear end edge of the outer link portion of the chain member at the front being spaced apart from the corresponding recessed portion of the chain member at the rear and cooperating with the corresponding recessed portion of the chain member at the rear to define a second insertion space, the first insertion space and the second insertion space at the same side being communicated, wherein a front edge and a rear edge of the second link plate of each chain member each have a chamfer.

* * * * *